United States Patent
Hames

(10) Patent No.: US 11,212,965 B1
(45) Date of Patent: Jan. 4, 2022

(54) TOOL FOR DEEP SELECTIVE PRUNING OF BRANCHES AND VINES

(71) Applicant: Lester Duane Hames, Yukon, OK (US)

(72) Inventor: Lester Duane Hames, Yukon, OK (US)

( * ) Notice: Subject to any disclaimer, the term of this patent is extended or adjusted under 35 U.S.C. 154(b) by 0 days.

(21) Appl. No.: 17/160,830

(22) Filed: Jan. 28, 2021

(51) Int. Cl.
*A01G 3/08* (2006.01)
*A01G 3/025* (2006.01)

(52) U.S. Cl.
CPC .......... *A01G 3/081* (2013.01); *A01G 3/0255* (2013.01)

(58) Field of Classification Search
CPC ........ A01G 3/025; A01G 3/0255; A01G 3/08; A01G 3/081; B23D 29/026; A01K 17/00; B26B 17/00; B26B 3/169; B26B 13/16; B26B 13/06
USPC ........................... 30/241–244, 238, 182–184
See application file for complete search history.

(56) References Cited

U.S. PATENT DOCUMENTS

| | | | | |
|---|---|---|---|---|
| 46,797 A * | 3/1865 | Harris | ................. | B23D 29/026 30/242 |
| 57,817 A * | 9/1866 | Evans et al. | ......... | B23D 29/026 30/242 |
| 249,820 A * | 11/1881 | Beckley | ............... | B23D 29/026 30/242 |
| 278,108 A * | 5/1883 | Drake | .................... | A01K 17/00 30/243 |
| 448,092 A * | 3/1891 | Stout | ...................... | A01K 17/00 30/243 |
| 1,061,661 A * | 5/1913 | Cloes | ..................... | A01G 3/025 30/238 |
| 1,206,985 A * | 12/1916 | Bush | .................... | B23D 29/026 30/242 |
| 1,356,941 A * | 10/1920 | Rece | ...................... | A22B 3/086 30/242 |
| 1,385,481 A * | 7/1921 | Williams | ............... | B21D 7/063 30/182 |
| 2,150,268 A | 3/1939 | Denton | | |
| 2,270,495 A * | 1/1942 | Bernay | ................ | A01G 3/0255 30/242 |
| 2,480,797 A * | 8/1949 | Weber | .................... | B26B 13/16 30/242 |
| 2,533,962 A * | 12/1950 | Rowe et al. | ......... | A01G 3/0255 30/242 |

(Continued)

FOREIGN PATENT DOCUMENTS

DE 102016211975 A1 1/2018

OTHER PUBLICATIONS target.com; "Fiskars 3pc Tree & Shrub Care Set", retrieved from https://www.target.com on Jan. 22, 2021.

*Primary Examiner* — Jason Daniel Prone
(74) *Attorney, Agent, or Firm* — Robert H. Frantz

(57) ABSTRACT

A precision pruner for selectively cutting twigs, branches, stalks and vines deep within a bush or shrub has an elongated tool portion with at least one notch. A first handle is stationarily disposed on the tool portion and a cutter portion is slidably disposed on the tool portion. A cutting edge is aligned with notch(es) in a normal position, and a second handle is pivotally disposed on the first handle portion such that squeezing the first and second handles together slides the cutter portion relative to the tool portion out of the normal position so that the cutting edge(s) and the notch(es) are moved towards each other, thereby cutting any material received within the notch(es).

11 Claims, 5 Drawing Sheets

(56) References Cited

U.S. PATENT DOCUMENTS

| | | | | |
|---|---|---|---|---|
| 2,591,409 A | * | 4/1952 | Dahl | B25B 27/00 30/241 |
| 2,666,985 A | * | 1/1954 | Sewell | B26B 17/003 30/182 |
| 2,763,926 A | * | 9/1956 | Pate | A01G 3/0255 30/241 |
| 2,856,686 A | * | 10/1958 | Stanley | B23D 29/023 30/242 |
| 3,102,444 A | * | 9/1963 | Basile | H02G 1/1295 30/182 |
| 3,837,077 A | * | 9/1974 | Filter | D03D 47/00 30/241 |
| 3,855,699 A | * | 12/1974 | Charlett | A01G 3/02 30/242 |
| 3,922,780 A | * | 12/1975 | Green | B26B 17/02 30/241 |
| 4,526,070 A | * | 7/1985 | Wiener | B25B 7/02 30/242 |
| 4,989,325 A | * | 2/1991 | Durkin | B26B 17/003 30/243 |
| 5,046,250 A | * | 9/1991 | Huang | B26B 17/02 30/241 |
| 5,065,513 A | * | 11/1991 | Reiswig | A45D 29/02 30/241 |
| 5,261,163 A | * | 11/1993 | Shearhart | A01G 5/00 30/242 |
| 5,263,257 A | * | 11/1993 | Takigawa | A01G 3/08 30/514 |
| 5,711,078 A | * | 1/1998 | Patton | B26B 15/00 30/241 |
| 5,924,201 A | * | 7/1999 | Wang | B26D 3/169 30/243 |
| 6,374,498 B1 | * | 4/2002 | Liu | A01G 3/0255 30/242 |
| 7,861,414 B1 | * | 1/2011 | Kern | B26D 7/02 30/241 |
| 8,141,465 B2 | * | 3/2012 | Reyes | B26B 27/00 30/241 |
| 2009/0038162 A1 | | 2/2009 | Shan | |

* cited by examiner

TOOL FOR DEEP SELECTIVE PRUNING OF BRANCHES AND VINES

FIELD OF THE INVENTION

The invention generally relates tools and devices to selectively prune small branches and vines deep within a bush or shrub.

BACKGROUND OF INVENTION

Pruning tools are widely available in home improvement stores, hardware stores, and variety department stores. They can generally be broken into two large groups, the first of which would be shaping pruners, or hedge trimmers, which have a pair of long blades opposing each other with a pivot and two handles which operate like a long pair of scissors. These are useful for creating a shape to an exterior of a bush or shrub as they cut leaves and very small branches (twigs) easily in a long, straight line. The second group of ordinary pruning tools are branch pruners which often have a pair of longer handles, a pivot, and a smaller C-shaped cutter pair, which are meant to cut thicker branches and stems.

SUMMARY OF THE DISCLOSURE OF THE ONE OR MORE EMBODIMENTS OF INVENTION

A precision pruner for selectively cutting twigs, branches, stalks and vines deep within a bush or shrub is disclosed, having an elongated tool portion with a distal end and a proximal end and with at least one notch formed in an edge of the tool portion; a first handle portion stationarily disposed on the tool portion; a cutter portion slidably disposed on the tool portion having a cutting edge aligned with the at least one notch in a normal position; and a second handle portion pivotally disposed on the first handle portion and attached to the cutter portion such that squeezing the first handle and the second handle together slides the cutter portion relative to the tool portion out of the normal position such that the at least one cutting edge and the at least one notch are moved towards each other, thereby cutting any material received within the at least one notch while in the normal position.

BRIEF DESCRIPTION OF THE DRAWINGS

The description set forth herein is illustrated by the several drawings, which are not necessarily drawn to mechanical scale.

DETAILED DESCRIPTION OF EMBODIMENT(S) OF THE INVENTION

The present inventor has recognized that there is an unmet need in the arts of tools for shaping, pruning and maintaining shrubs and bushes. Often, a gardener finds a need to selectively cut a branch or a vine which is growing deep within the structure of a bush or shrub. If the gardener tries to use the ordinary shaping type of tool with the long scissor-like cutters to probe deep into the growth of the bush, the cutters may cut more of the bush or shrub than what the gardener wishes to cut. Such large tools with large cutting edges or surfaces are just not suitable for precision work within a bush or shrub. If the gardener tries to use the branch pruning tool to reach deep inside the bush or shrub, the gardener is often frustrated because the C-shaped cutters which are provided are designed for cutting larger, thicker branches, so smaller, more supple vines and branches may simply bend and/or smash in the cutters rather than be cut. Since both of these types of ordinary tools have long handles to generate cutting leverage, which is unnecessary for trimming smaller branches and vines, they also require two hands to operate.

Therefore, at least one objective and advantage of the present invention is that it allows for selective, precise trimming of smaller branches and vines deep within the growth of a bush or shrub. A second objective or advantage is that embodiments of the invention may be suitable for single-handed operation, thereby allowing the user to use a free hand to move branches and leaves out of the way as the tool is inserted into the growth of the bush or shrub for cutting of selective internal branches or vines. Still other advantages and objectives of the present invention will be evident from the following paragraphs and accompanying figures.

Figure 1:
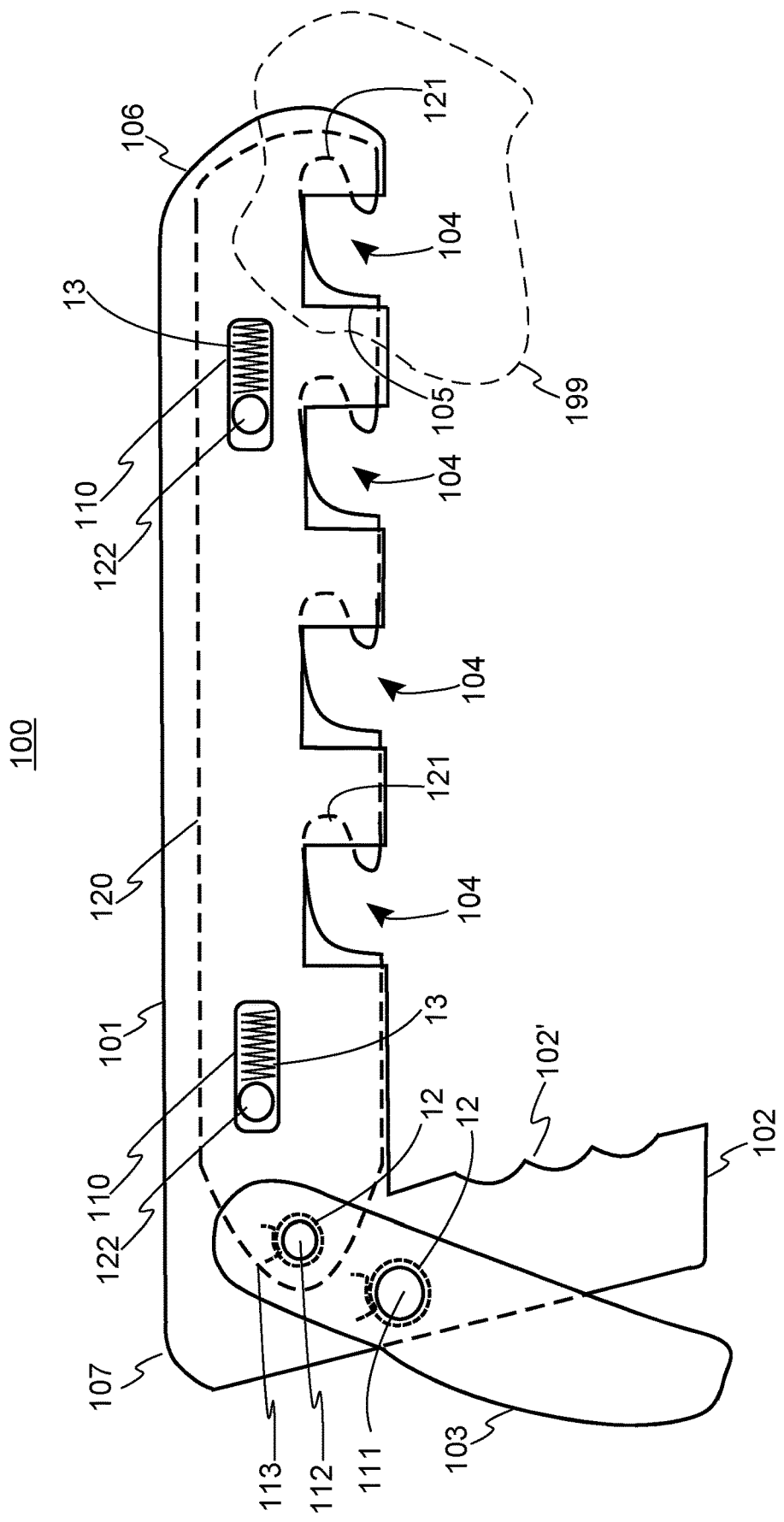
FIG. 1 illustrates one available embodiment of a pruning tool according to the present invention, this depiction being in an open position ready to receive a branch or vine.

Referring now to FIG. 1, an example embodiment 100 of the present invention is shown which has a generally elongated tool shape for reaching into the growth of a bush or shrub and a squeeze-type handle suitable for single handed operation. In this example configuration, the handle is positioned at or on the proximal end 107 of the tool portion at about a right angle relative to the tool portion, however, in other embodiments, the handle may be in line with the tool portion or at other angles. This particular embodiment has the tool portion 101 with at least one, and possibly several, notches 105 disposed along one or more edges of the tool portion 101. At least one part of the squeeze-type handle, such as front handle portion 102, may be formed integrally or attached to the tool portion 101, which may be provided with one or more knurls 102' to promote better hand gripping of the tool. This component may be manufactured from a plate of suitably strong metal, such as steel, aluminum, etc.

A moveable cutter sub-assembly is also provided in this example embodiment which includes a cutter plate 120 which includes at least one, and possibly several, cutting jaws 121 which, in a normal position, are aligned with the notches 105 in the tool portion to form one, and possibly several, material receiving gates 104. This cutter plate may also be manufactured from a suitably strong metal, such as steel, aluminum, etc., and operates in parallel sliding fashion alongside the tool portion 101, kept in alignment by one or more aligners such as slots 110 and pins 122.

Figure 2:
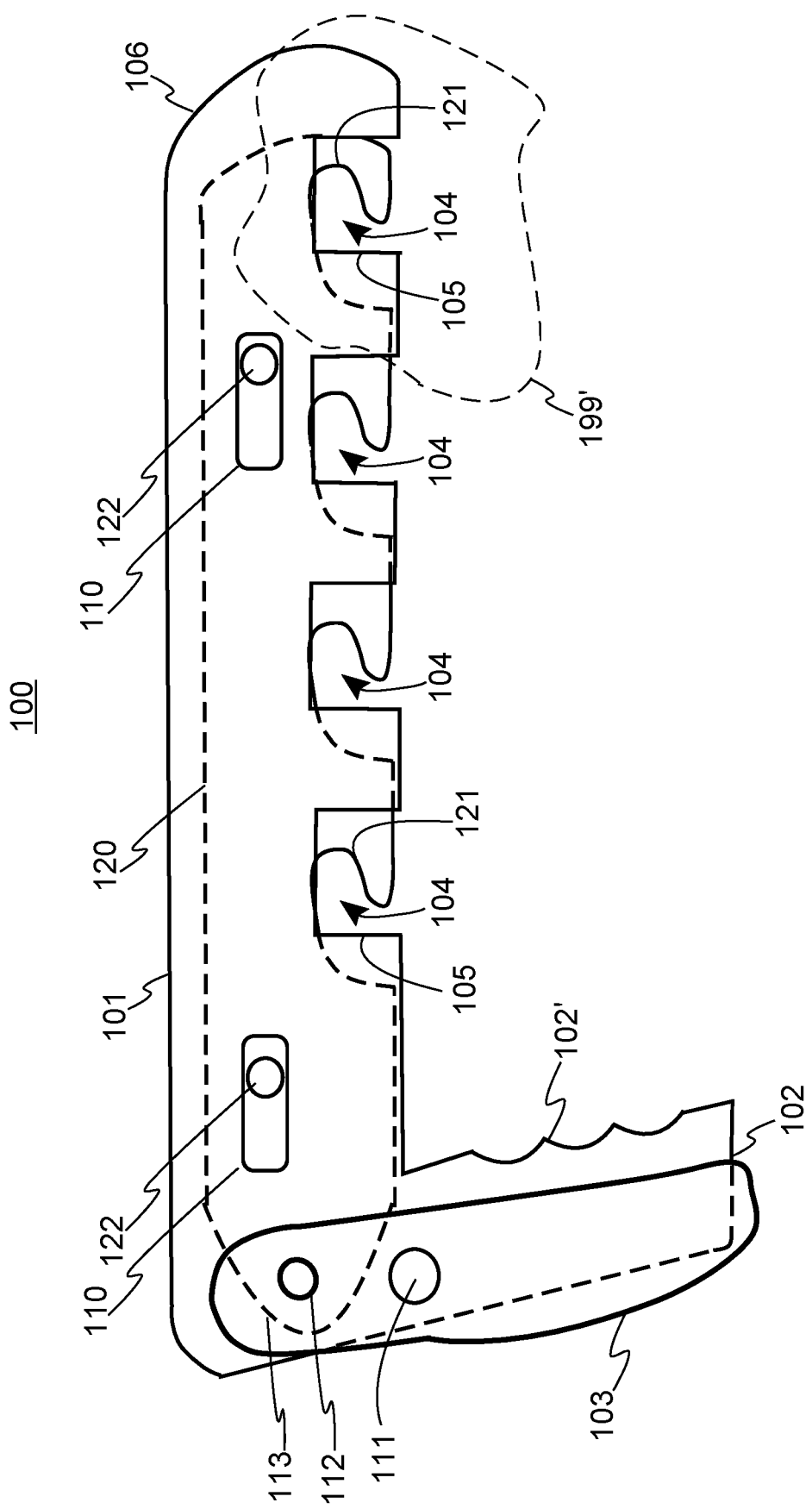
FIG. 2 provides another depiction of the device of FIG. 1, however, shown in a partially closed (cutting) position.

The cutter sub-assembly is also provided, in this example embodiment, with a back handle portion 103 which is attached to the cutter plate 120 using a first pivot 112, and to the tool portion in by a second pivot 111. These pivots may be constructed using known mechanisms, such as but not limited to posts (or bosses), retention pins (cotter pins, etc.), retention washers, rivets, threaded bolts and nuts, etc. The general operation is that, when the user squeezes the back handle portion 103 towards the front handle portion 102, the back handle rotates around the second pivot 111 in a counterclockwise direction, which draws the first pivot 112 towards the rear of the tool portion 101 while the aligners maintain the one or more notches 105 and cutting jaws 121 in linear arrangement and while the receiving gates close around a captured branch or vine, as shown in FIG. 2.

After the cutting action has been completed, the user releases pressure on the handle portions 102, 103, and in a preferred embodiment, a spring returns the back handle portion 103 and the cutting plate 120 to their normal position as shown in FIG. 1. The spring can be of a number of conventional types, such as one or more springs 12 wound around the one or more pivots 111, 112, or a compressible spring 13 positioned in line with the cutting plate 120 and the tool portion 101.

In some embodiments, there may be only one cutter provided, for example, at the distal end 106 of the tool portion. In other embodiments, there may be multiple cutters provided along one edge of the tool portion or even along two edges of the tool portion. In some embodiments, there may be two tool portion plates assembled in parallel with a cutter sub-assembly disposed between the two tool portion plates, while in other embodiments, there just be one tool portion and one cutter sub-assembly.

Figure 3:
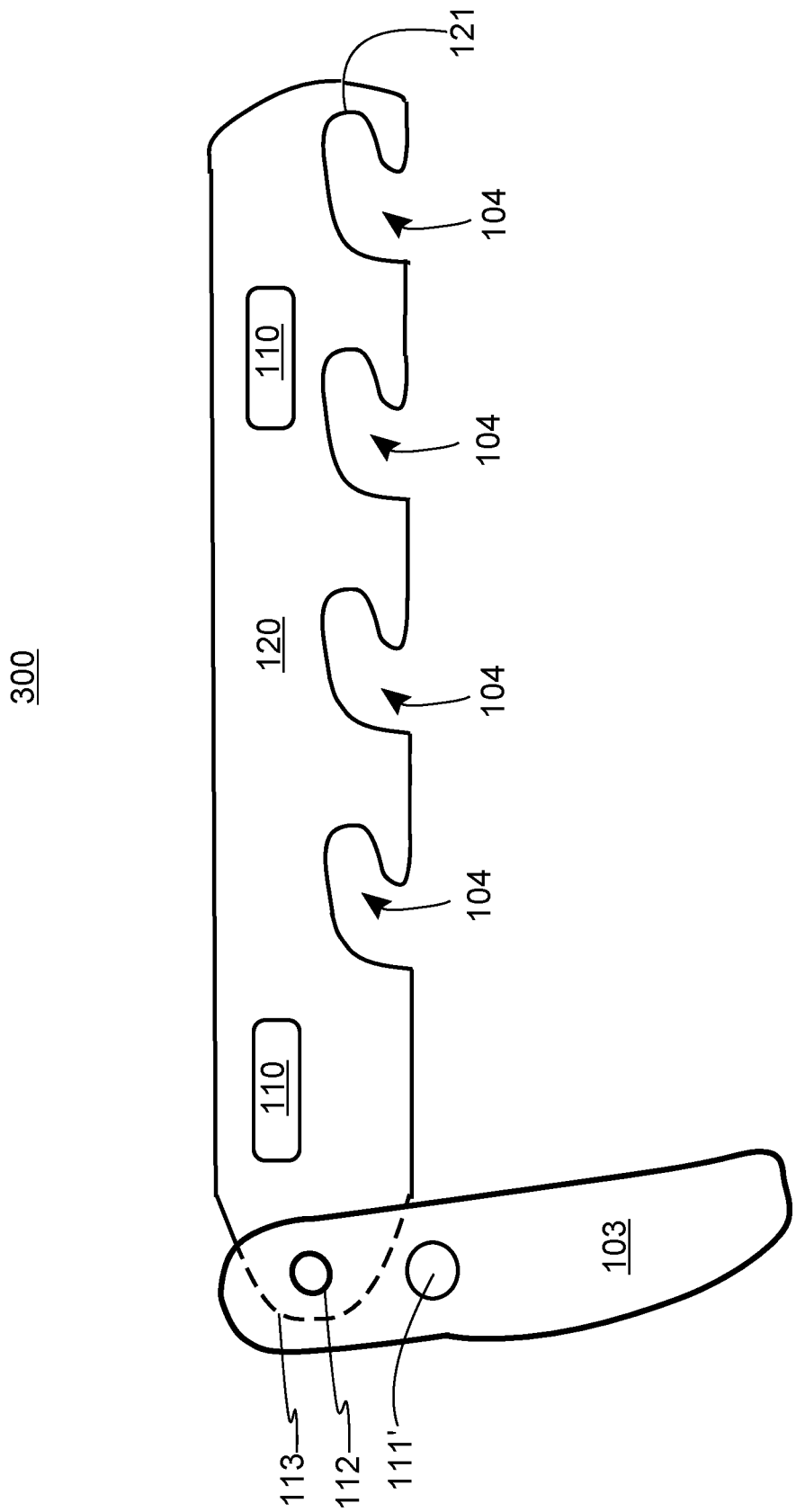
FIG. 3 depicts of the cutting sub-assembly according to the example embodiment of FIGS. 1 and 2.
Figure 4:
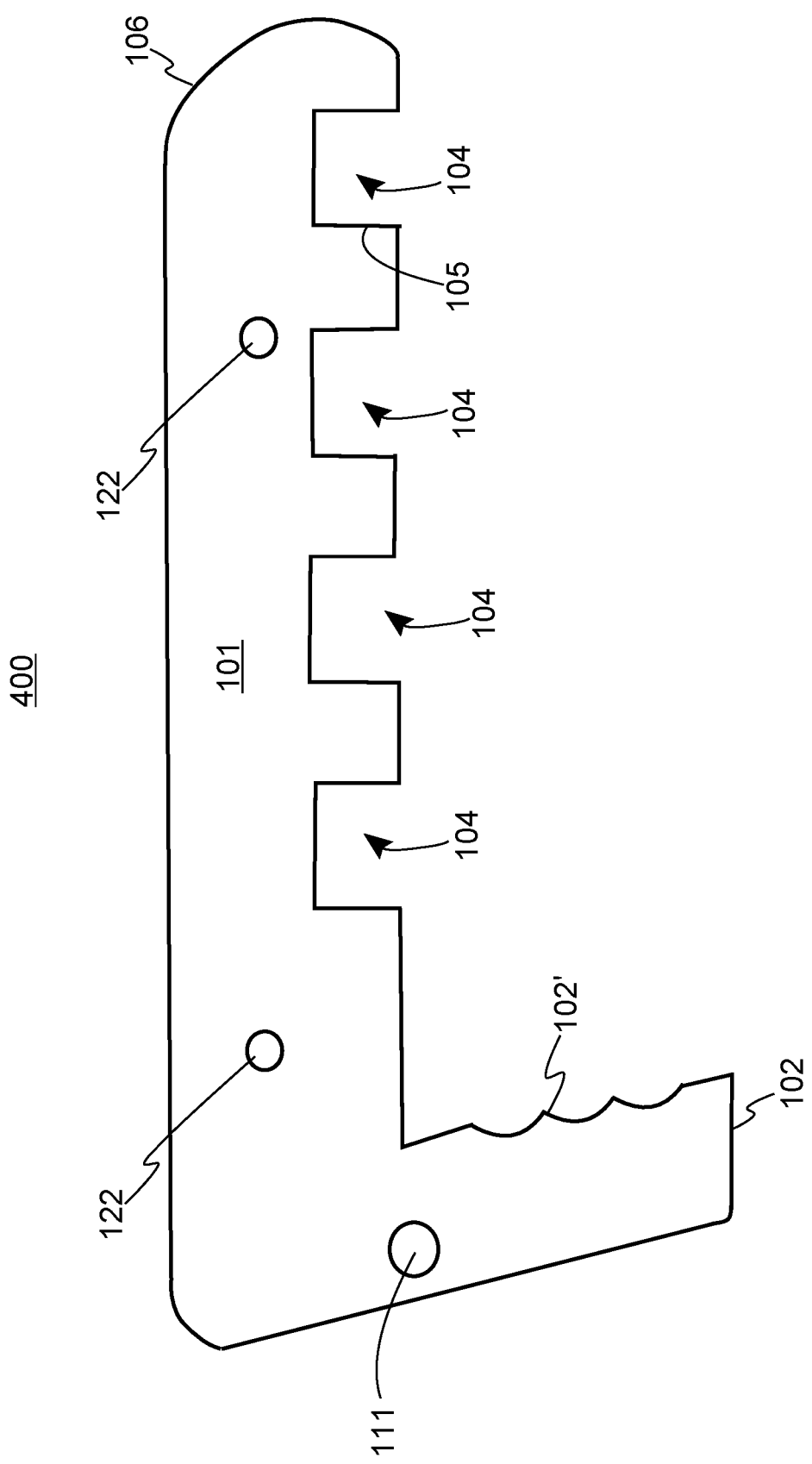
FIG. 4 illustrates the base plate according to the example embodiment of FIGS. 1 and 2.

Referring now to FIG. 3, more details of the example embodiment of a cutter sub-assembly 300 are shown, including a receiver 111' for the second pivot from the tool portion. FIG. 4 shows 400 more details of the example embodiment of a tool portion 101, including pins or pivots for the aligners and the handle portion.

Figure 5:
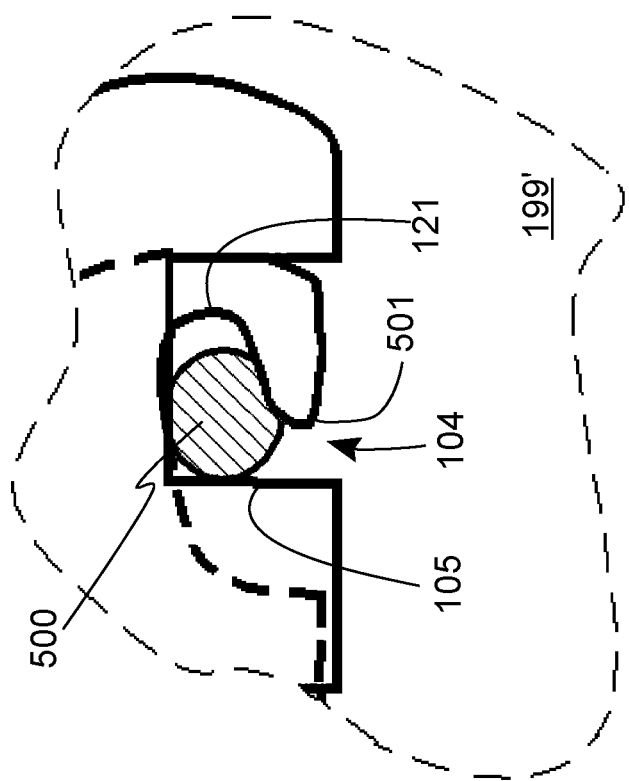
FIG. 5 shows details of the cutter of FIG. 1, including the positioning of a branch or vine within the cutter.
Figure 6:
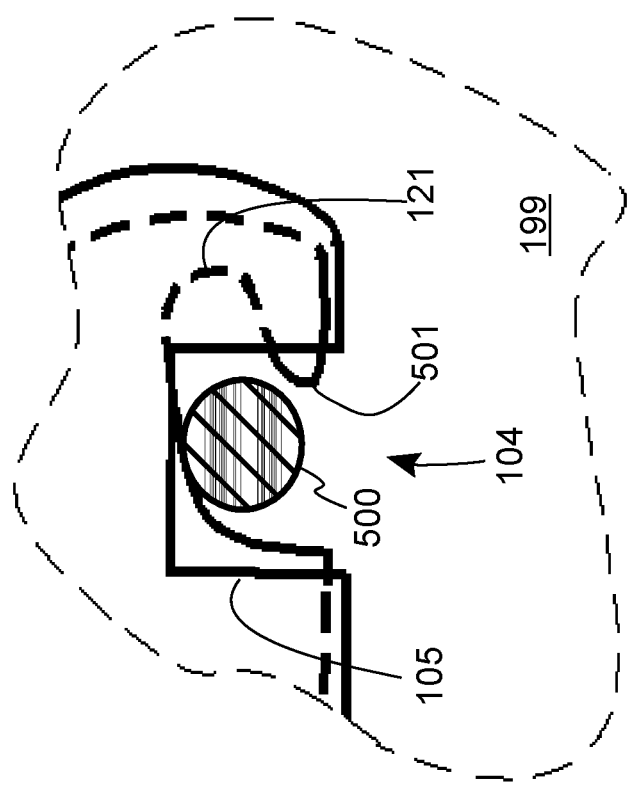
FIG. 6 shows details of the cutter of FIG. 2, including the positioning of a branch or vine within the cutter.

FIG. 5 illustrates details of an open 199 cutter, such as shown in FIG. 1. In this embodiment, at least one sharpened edge is provided on the cutting jaw 121, on the rear of the notch 105, or in both positions. Further, in this example embodiment, the cutting jaw 121 is formed into a J-shape 501 which promotes hooking and capturing of smaller twigs, branches and vines 500. It is particularly useful for cutting thin and supple vines for a configuration to have a flat edge on the rear of the notch 105 against which the vine is pushed and cut by the closing movement of the cutting jaw, as shown in a partially closed 199' position of the cutter in FIG. 6.

This embodiment and other embodiments according to the present invention, therefore, meet one or more of the objectives and fulfill the unmet needs in the art for a precision cutting tool for reaching deep within the growth of a bush or shrub, which is operable by a single hand thereby allowing a second hand to be free to manipulate other growth of the shrub or bush, and to cut and trim smaller organic elements such as twigs, branches and vines.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A cutting sub-assembly for a precision pruner comprising:
    an elongated first plate having at least one first notch formed in a first edge of the first plate, wherein the at least one first notch is at least partially defined by an edge substantially perpendicular to the first edge of the first plate; and
    a second plate slidably disposed on the first plate, and having at least one second notch formed in a second edge of the second plate, wherein the at least one second notch is at least partially defined by a J-shaped edge juxtaposed to the substantially perpendicular edge of the at least one first notch so that material to be pruned is received in the at least one first notch and the at least one second notch at the same time;
    wherein sliding of the second plate relative to the first plate in a first direction moves the substantially perpendicular edge of the at least one first notch and the J-shaped edge of the at least one second notch towards one another such that a tip portion of the J-shaped edge engages the material received within the at least one first and the at least one second notches and prunes the received material.

2. The cutting sub-assembly for a precision pruner as set forth in claim 1 wherein the J-shaped edge of the at least one second notch on the second plate is sharpened.

3. The cutting sub-assembly for a precision pruner as set forth in claim 1 further comprising a spring disposed between the first plate and the second plate to force the second plate to slide relative to the first plate in a second direction opposite the first direction to position the at least one first notch and the at least one second notch to release or receive the material.

4. The cutting sub-assembly for a precision pruner as set forth in claim 1 wherein the substantially perpendicular edge of the at least one first notch is sharpened.

5. The cutting sub-assembly for a precision pruner as set forth in claim 1 wherein the at least one first notch comprises two or more first notches.

6. The cutting sub-assembly for a precision pruner as set forth in claim 1 wherein the at least one second notch is two or more second notches.

7. A process for manufacturing a cutting sub-assembly for a precision pruner comprising:
    forming at least one first notch disposed in a first edge of a first elongated plate, wherein the at least one first notch is at least partially defined by an edge substantially perpendicular to the first edge of the first plate;

forming at least one second notch formed in a second edge of a second plate, wherein the at least one second notch is at least partially defined by a J-shaped edge; and slidably disposing the second plate on the first plate such that the J-shaped edge of the at least one second notch is juxtaposed to the substantially perpendicular edge of the first notch so that material to be pruned is received in the at least one first notch and the at least one second notch at the same time, yielding a cutting sub-assembly configured to, upon sliding of the second plate relative to the first plate in a first direction, moves the substantially perpendicular edge of the at least one first notch and the J-shaped edge of the at least one second notch towards one another such that a tip portion of the J-shaped edge engages the material received within the at least one first and the at least one second notches and prunes the received material.

8. The process as set forth in claim 7 further comprising sharpening at least a portion of the J-shaped edge of the at least one second notch on the second plate.

9. The process as set forth in claim 7 further comprising disposing a spring between the first plate and the second plate which forces the second plate to slide relative to the first plate in a second direction opposite the first direction to position the at least one first notch and the at least one second notch to release or receive the material.

10. The process as set forth in claim 7 further comprising sharpening the substantially perpendicular edge of the at least one first notch.

11. The process as set forth in claim 7 wherein the forming of the at least one notch comprises forming two or more first notches and the forming of the at least one second notch comprises forming two or more second notches.

* * * * *